(12) United States Patent
Yoshida et al.

(10) Patent No.: US 10,500,731 B2
(45) Date of Patent: Dec. 10, 2019

(54) ROBOT SYSTEM INCLUDING ROBOT SUPPORTED BY MOVABLE CARRIAGE

(71) Applicant: FANUC CORPORATION, Yamanashi (JP)

(72) Inventors: Junichirou Yoshida, Yamanashi (JP); Fumikazu Warashina, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 254 days.

(21) Appl. No.: 15/723,732

(22) Filed: Oct. 3, 2017

(65) Prior Publication Data

US 2018/0093380 A1 Apr. 5, 2018

(30) Foreign Application Priority Data

Oct. 4, 2016 (JP) ................. 2016-196434

(51) Int. Cl.
*B25J 19/02* (2006.01)
*B25J 9/16* (2006.01)
*B25J 5/00* (2006.01)
*B25J 13/08* (2006.01)

(52) U.S. Cl.
CPC ............. *B25J 9/1697* (2013.01); *B25J 5/007* (2013.01); *B25J 13/088* (2013.01); *B25J 19/021* (2013.01); *B25J 19/023* (2013.01); *G05B 2219/37067* (2013.01); *G05B 2219/40298* (2013.01)

(58) Field of Classification Search
CPC ...... B25J 9/1697; B25J 9/1664; B25J 9/1684; B25J 9/1692; B25J 19/02; B25J 19/022; B25J 19/023; G05B 2219/37555; G05B 2219/37561; G05B 2219/40003; G05B 2219/36433; G05B 2219/39046; G05B 2219/39045; Y10S 901/47; G06T 2207/30244; G06T 7/70; G06T 7/80
USPC .............. 700/259, 192, 245, 254; 901/1, 41; 701/26, 28, 523
See application file for complete search history.

(56) References Cited

U.S. PATENT DOCUMENTS

| | | | |
|---|---|---|---|
| 9,651,499 B2 * | 5/2017 | Mahuna | G01N 21/8851 |
| 9,656,388 B2 * | 5/2017 | Nammoto | B25J 9/1612 |
| 9,659,236 B2 * | 5/2017 | Barker | G06K 9/6255 |
| 9,734,419 B1 * | 8/2017 | Ye | G06T 7/00 |

FOREIGN PATENT DOCUMENTS

| | | |
|---|---|---|
| JP | 089151 B2 | 1/1996 |
| JP | 2602812 B | 4/1997 |
| JP | 10151588 A | 6/1998 |

(Continued)

*Primary Examiner* — Dalena Tran
(74) *Attorney, Agent, or Firm* — RatnerPrestia

(57) ABSTRACT

The robot system includes a carriage for supporting a robot. The robot system includes a camera, and a mark disposed in a workspace. The control device includes a position acquisition part that is configured to acquire a position of the mark on the basis of an image captured by the camera, and a determination part configured to determine whether or not the robot is located at a position within a predetermined determination range. When the determination part determines that the position of the robot deviates from the determination range, the display device displays the direction and the movement amount in which the carriage is to be moved.

5 Claims, 9 Drawing Sheets

(56) References Cited

FOREIGN PATENT DOCUMENTS

| | | |
|---|---|---|
| JP | H 11-58273 A | 3/1999 |
| JP | 11156764 A | 6/1999 |
| JP | 11175150 A | 7/1999 |
| JP | 11221784 A | 8/1999 |
| JP | 2001252883 A | 9/2001 |
| JP | 2002313870 A | 10/2002 |
| JP | 2003305676 A | 10/2003 |
| JP | 2004-138462 A | 5/2004 |
| JP | 2010064198 A | 3/2010 |
| JP | 2010162635 A | 7/2010 |
| JP | 4820395 B | 11/2011 |
| JP | 5061965 B | 10/2012 |
| JP | 2013203216 A | 10/2013 |

\* cited by examiner

ROBOT SYSTEM INCLUDING ROBOT SUPPORTED BY MOVABLE CARRIAGE

BACKGROUND OF THE INVENTION

1. Field of the Invention

The present invention relates to a robot system including a robot supported by a movable carriage.

2. Description of the Related Art

In the related art, a robot system that is configured to extend a work area of a robot by moving a traveling carriage on which the robot is mounted, is known. For example, a traveling carriage to which a robot is fixed travels along a rail that is laid on the ground, is known. Though the traveling carriages are capable of determining a position with high accuracy, dedicated equipment such as rails for the traveling is required. Further, facilities cannot be easily modified after installation. Due to this, a disadvantage arises in that modifications to production process, production method or the like cannot be easily changed.

Also, a device in which a robot is mounted on a carriage that is able to move in any direction and moved to a work area is known (for example, see Japanese Patent No. 5061965 Japanese Unexamined Patent Publication No. 11-58273). This device has a problem in that the robot is mounted on the carriage and thereby positioning accuracy of the robot is not ensured due to the movement of the carriage. In this device, a positional deviation of the carriage is measured by using a camera or a force sensor. Then, the operation of the robot is offset with respect to the amount that is deviated from a predetermined position. By offsetting a teaching position of the robot by calculation, the robot can correctly perform the work even if the carriage deviates from the predetermined position.

Further, Japanese Patent No. 4820395 discloses a system in which a dual arm robot can adjust a work position by own exertion when the position at which the dual arm robot performs the work is changed. In this system, an adjustment of the position of the carriage is automatically carried out.

Regarding vision sensors, Japanese Unexamined Patent Publication No. 2004-138462A discloses a three-dimensional vision sensor that is capable of measuring a three-dimensional position and orientation of a workplace accurately even when the position and orientation of the workpiece change. Additionally, Japanese Patent No. 2602812B discloses a method in which first mark, second mark, and third mark are imaged by using three vision sensors mounted on a carriage, whereby a three-dimensional position and orientation of the object are measured.

SUMMARY OF INVENTION

In a robot system including a carriage, there are cases where a robot is unable so perform a work in the method in which the offset is performed by calculation of a teaching position of the robot. For example, there are cases where a door of a machine tool is opened and the robot performs the work inside the machining room. It is necessary for the robot to perform the work while an arm is inserted through a narrow opening into a machining room. However, when a carriage for supporting the robot is inappropriately positioned, the robot may interfere with the machine tool even with an offset of the teaching position of the robot. Accordingly, even when a carriage has no positioning mechanism that decides the position accurately, the position of the carriage is preferably adjusted with a certain degree of accuracy.

When an operator determines a position of a carriage, a method may be employed in which a mark is disposed at an area where the carriage is to be located such that the carriage is aligned with the mark. Alternatively, a method may be employed in which a position of a carriage is determined by installing a jig or the like for abutting against the carriage. However, an appropriate position for locating the carriage varies depending on an arm length of the robot, the workplace to which the work is performed, and the like. For this reason, in a system that is required to handle many types of workpiece, it is necessary to prepare a plurality of marks or a plurality of jigs. Further, a problem arises in that the operator has to be familiarized with the configuration of the robot system before arranging the carriage.

In the device disclosed in the above Japanese Patent No. 4820395, the carriage can be located at a desired position. Unfortunately, since dedicated devices such as a drive device for moving the carriage and a workbench-gripping mechanism for a robot are required, a problem arises in that the structure of the robot system becomes complicated.

A robot system of the present invention includes a robot performing predetermined a work, and a carriage for supporting the robot and configured to be moved by an operation of an operator. The robot system includes a vision sensor fixed on a wrist of the robot or to the carriage, and a mark disposed in a workspace where the carriage is located when the robot performs the work. The robot system includes an arithmetic processing device configures to process information acquired by the vision sensor, and a display device configured to display a result of the processing executed by the arithmetic processing device. The arithmetic processing device includes a position acquisition part configured to acquire a position of the mark on the basis of an image captured by the vision sensor in a state where the carriage is moved to the workspace. The arithmetic processing device includes a determination part configured to determine whether or not the robot is located at a position within a predetermined determination range on the basis of the position of the mark acquired by the position acquisition part. When the determination part determines that the position of the robot deviate a from the determination range, the determination part computes the direction and a movement amount in which the carriage is to be moved so as to enable the robot to reach the target position. The display device displays the direction and the movement amount in which the carriage is to be moved.

In one above invention, in the vision sensor, a relationship between the position of the robot and the image of the rustic acquired by the vision sensor can be calibrated in advance. The position acquisition part can compute the position of the mark by processing the image of the mark in which a positional relationship with respect to the workspace is set.

In the above invention, the determination part can compute a distance between an actual position of the mark and a target position of the mark in a plurality or predetermined directions on the basis or a position of the mark acquired by the position acquisition part. The determination part can determine whether or not the distance is within the determination range in the respective directions.

In the above invention, the display device can update a display on the basis or a result or a determination by the determination part, so that the operator can adjust the position of the carriage while the operator monitors the display device.

Another robot system of the present invention includes a robot configured to perform a predetermined work, and a carriage for supporting the robot and configured to be moved by an operation of an operator. The robot system includes a vision sensor arranged in a workspace where the carriage is located when the robot performs the work, and a mark disposed on a wrist of the robot or on the carriage. The robot system includes an arithmetic processing device configured to process information acquired by the vision sensor, and a display device configured to display the result of the computation by the arithmetic processing device. The arithmetic processing device induces a position acquisition part configured to acquire a position of the mark on the basis of an image captured by the vision sensor in a state where the carriage is moved to the workspace. The arithmetic processing device includes a determination part configured to determine whether or not the robot is located at a position within a predetermined determination range on the basis of the position of the mark acquired by the position acquisition part. When the determination part determines that the position of the robot deviates from the determination range, the determination part computes the direction and a movement amount in which the carriage is to be moved so as to enable the robot to reach the target position. The display device displays the direction and the movement amount in which the carriage is to be moved.

DETAILED DESCRIPTION

A robot system according to embodiments will be described with reference to FIGS. 1 to 9. The robot system is a device in which a robot is included and the robot performs a predetermined work. In the robot system of the present embodiment, the robot is fixed to a carriage that is configured to move in any direction. An operator can change the position of the robot by moving the carriage.

Figure 1:
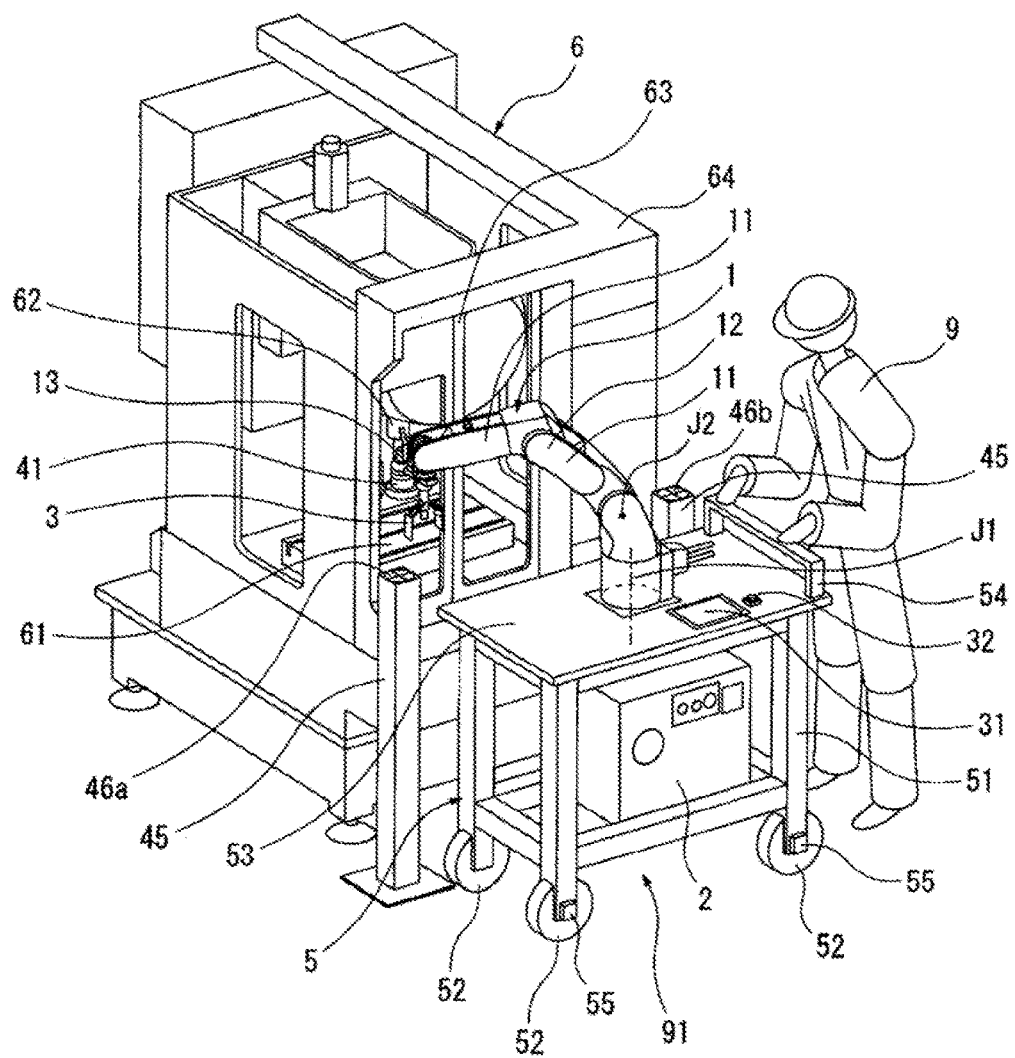
FIG. 1 is a perspective view of first robot system in the embodiment.

FIG. 1 is a perspective view of first robot system 91 in the present embodiment. The first robot system 91 includes a robot 1. The robot 1 of the present embodiment is an articulated robot that includes a plurality of arms 11 and a plurality of joints 12. A wrist 13 is connected to the distal end of the arm 11. The robot 1 can freely change the position and posture of the wrist 13. A hand 3 serving as an end effector is fixed to the wrist 13. The hand 3 is formed to be capable of holding and releasing a workpiece. The end effector is not limited to the hand, and any device can be employed depending on the content of the work. The robot 1 can arrange a workpiece that is gripped by a hand 4 in a desired position and orientation. Further, the robot 1 has an allowable conveyable weight and a work range in which the robot 1 can grip and convey a workplace.

The robot system 91 of the embodiment performs the work on a machine tool 6. The machine tool 6 includes a frame body 64. The machine tool 6 includes a door 63 that is mounted on the frame body 64. The door 63 is formed so as to be openable and closable. In the machining room that is surrounded by the frame body 64, a spindle head 62 for supporting a tool and a table 61 for supporting a workpiece are disposed. During a period for machining the workplace, at least one of the spindle bead 62 and the table 61 moves, whereby the relative position of the tool with respect to the workpiece is changed. Further, the workpiece is machined in a freely-selected shape.

The robot 1 performs the predetermined work. The robot 1 of the present embodiment arranges, on the table 61, a workpiece before machining and takes out, from the table 61, the workpiece after machining. During the period when the workpiece is replaced, the door 63 is in an opened state. The robot 1 can perform one work inside the machining room by inserting the arm 11 through the opening into the machining room.

The robot system 91 includes a carriage 5 for supporting the robot 1. The carriage 5 of the present embodiment is formed to travel on the ground. The carriage 5 includes a frame body 51 and wheels 52 mounted on the frame body 51. The carriage 5 includes a top plate 53 that is mounted on the upper portion of the frame body 51 and a handle 54 that is fixed to the frame body 51. An operator 3 can grip the handle 54 and move the carriage 5 in any direction. In other words, the operator can move the robot to a desired position. In an example illustrated in FIG. 1, the front side of the door 63 of the machine tool 6 corresponds to a workspace where the robot 1 performs the work. The operator 9 is arranging the carriage 5 on the front side of the machine tool 6.

The robot 1 is fixed on the top plate 53. In other words, the robot 1 is fixed to the carriage 5. The carriage 5 and the robot 1 move in an integrated manner. Any structure that is capable of supporting the robot, and moved by the operation of the operator can be employed for the carriage. For example, the carriage may be formed so as to move by a motor, and the operator may move the carriage by operating an operation panel.

The carriage 5 includes a stopper 55 for locking the carriage in position. The stopper 55 of the present embodiment has a function of preventing rotation of the wheels 52. The wheels can be locked by the stopper 55. After the position of the carriage 5 is determined, the stopper 55 is used by the operator 9 in order to lock the carriage 5 in position. Thereafter, a desired work can be performed by the robot 1. Any mechanism can be used for a device in order to lock the carriage. For example, an adjuster may be arranged on the carriage.

The robot system 91 includes a control device 2 that is configured to control the robot 1. In the present embodiment, the control device 2 is supported by the carriage 5. The control device 2 is moved with the carriage 5 in an integrated manner. The robot system 91 includes a display device 31 that is configured to display a result of the computation by the control device 2 of the robot. The display device 31 includes, for example, a display panel such as a liquid crystal panel. The display device 31 is disposed on the top plate 53. Further, a start button 32 for starting control for determining the position of the robot 1 is provided on the top plate 53.

Figure 2:
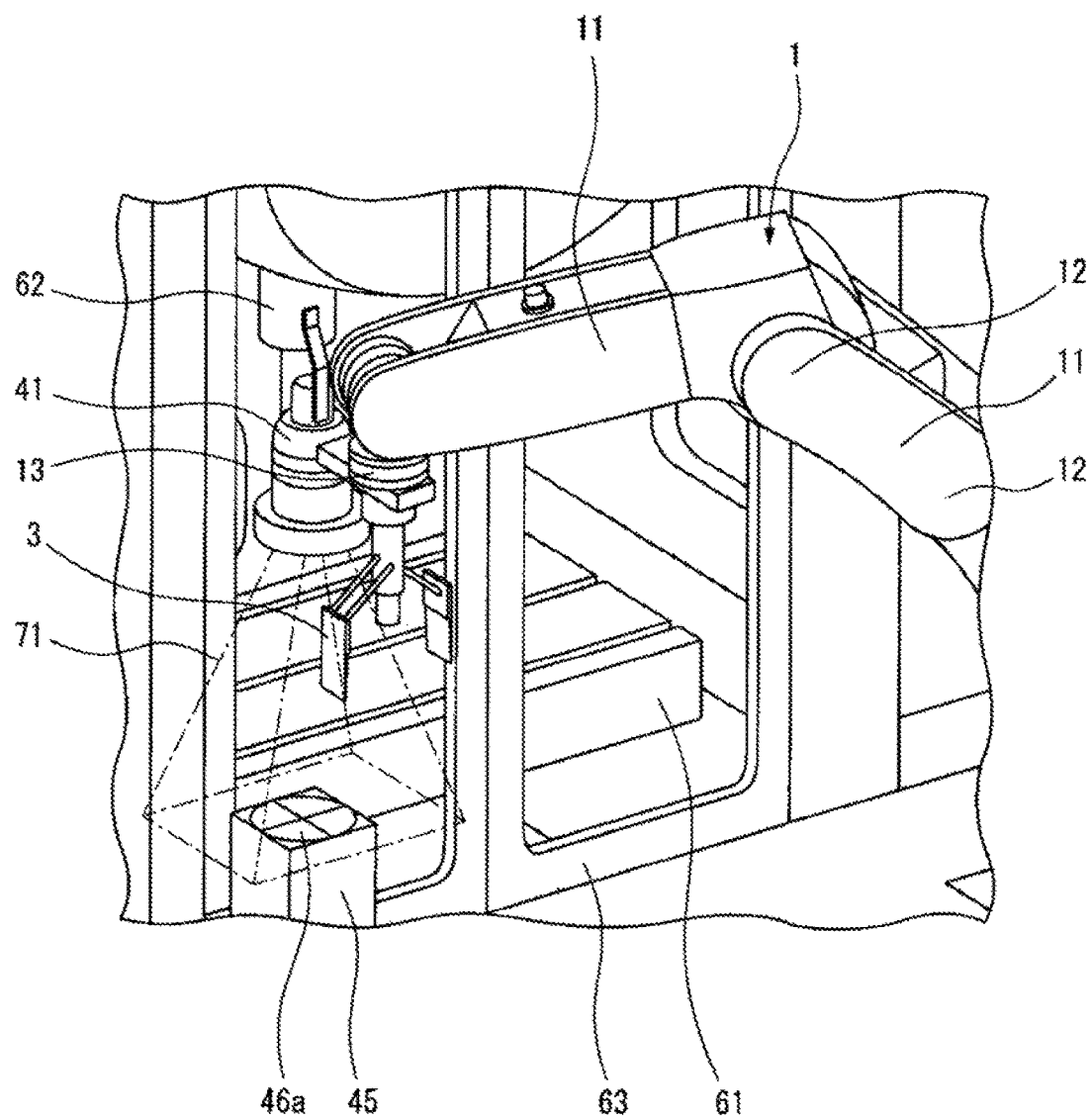
FIG. 2 is an enlarged perspective view illustrating a portion of the first robot system including a camera and a mark.

FIG. 2 shows an enlarged perspective view illustrating a robot and a mark in the present embodiment. Referring to FIGS. 1 and 2, the robot system 91 includes a camera 41 serving as a vision sensor that is fixed to the wrist 13 of the robot 1. The camera 41 of the first robot system 91 is a two-dimensional camera.

The robot system 91 includes marks 46a, 46b that are disposed in a workspace where the carriage 5 is located when the robot 1 performs the work. A pillar member 45 is placed in the workspace. In the example illustrated in FIG. 1, two pillar members 45 that are spaced apart from each other are disposed. The marks 46a, 46b are inscribed on the top surfaces of the pillar members 45. For the marks 46a, 46b, the positional relationships relative to the workspace are predetermined.

For the marks 46a, 46b, any symbol or letter in which the shape can be identified by an image processing, can be used. The marks 46a, 46b is preferably formed by the figures in which a rotation angle about the vertical axis as well as the positions of the marks in the horizontal direction can be detected when processing of the image that is captured by the camera 41 is executed. In the marks 46a, 46b of the present embodiment, two straight lines orthogonal to each other are drawn in a circle.

Figure 3:
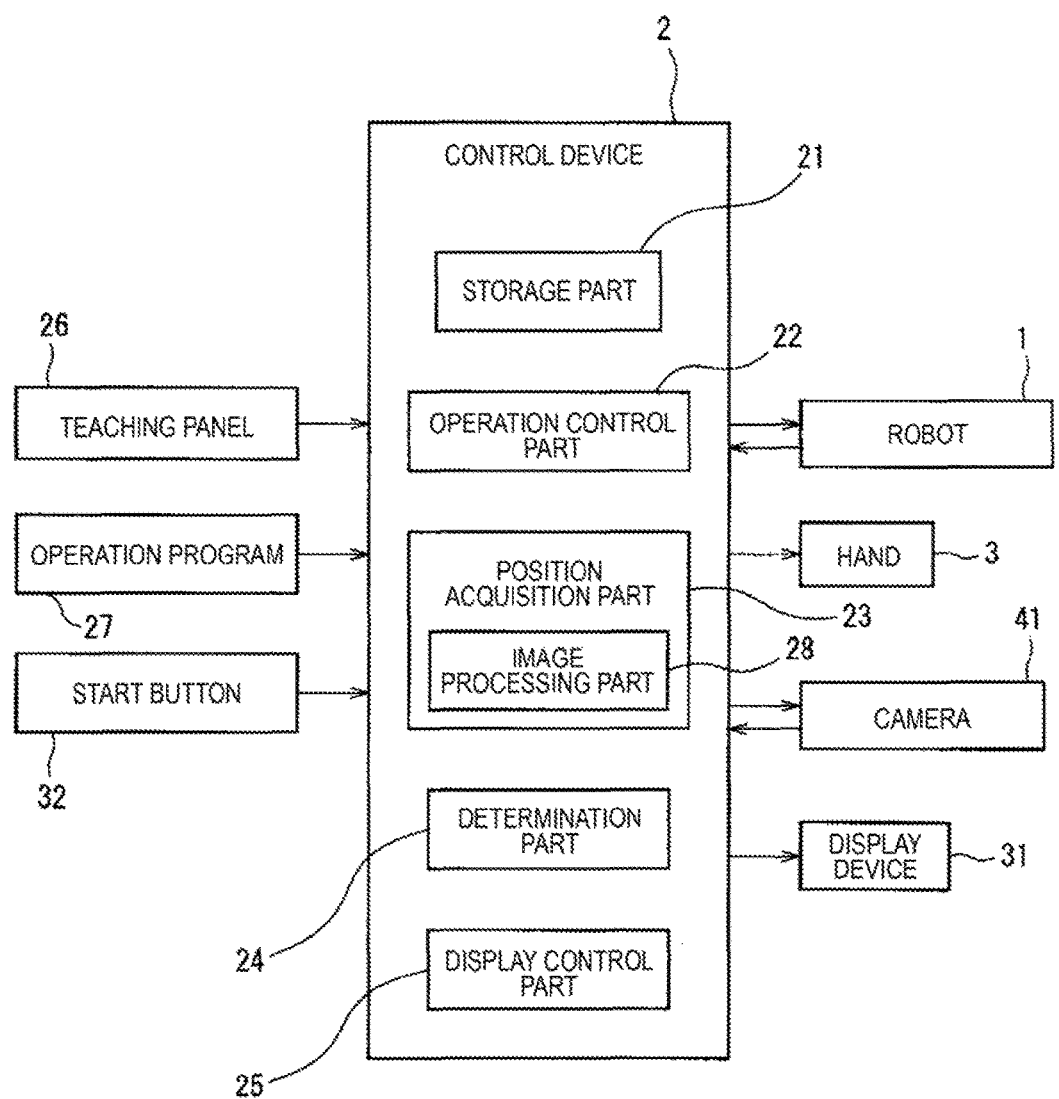
FIG. 3 is a block diagram of a robot system in the embodiment.

FIG. 3 shows a block diagram of a robot system in the present embodiment. The control device 2 includes an arithmetic processing device having a Central Processing Unit (CPU), a Random Access Memory (RAM), a Read Only Memory (ROM) or the like connected to one another via a bus. For the arithmetic processing device, a computer can be employed. The control device 2 includes a storage part 21 for storing information on the work. For the storage part 21, for example, a nonvolatile memory in which information does not disappear even when electricity is disconnected can be used. The control device 2 includes an operation control part 22 that is configured to control the operation of the robot 1 and the hand 3. The operation control part 22 also controls the operation of the camera 41.

In the present embodiment, an operation program 27 for driving the robot 1, the hand 3, and the camera 41 is inputted in advance in the control device 2. The operation program 27 is stored in the storage cart 21. The operation control part 22 drives the robot 1, the hand 3, and the camera 41 in accordance with the operation program 27. Alternatively, a teaching panel 26 is connected to the control device 2. The operator can set a teaching point of the robot 1 through the teaching panel 26. The teaching point is stored in the storage part 21. The operation control part 22 can drive the robot 1 in a manner to pass through the teaching point.

The control device 2 processes the information acquired by the vision sensor. The control device 2 includes a position acquisition part 23 that is configured to acquire the positions of the marks 46a, 46b on the basis or the images that are captured by the camera 41. The position acquisition part 23 includes an image processing part 28 that is configured to process the image captured by the camera 41. The operator moves the cart 5 to the workspace. When the marks 46a, 46b are imaged with the camera 41, the carriage 5 is moved to the vicinity of a target position in the workspace. The control device 2 includes a determination part 24 that is configured to determine whether or not the robot 1 is located at a position within a predetermined determination range on the basis of the positions of the marks 46a, 46b that is acquired by the position acquisition part 23. Further, the control device 2 includes a display control part 25 that is configured to control an image to be displayed on the display device 31.

The determination part 24 may determine that the position of the robot 1 is not reached within the determination range. In this case, the determination part 24 computes the direction and the movement amount in which the carriage 5 is need so as to enable the robot 1 to teach the target position. The display control part 25 transmits, to the display device 31, a command for displaying the direction and the movement amount in which the carriage 5 is moved. The display device 31 displays the direction and the movement amount in which the carriage 5 is moved. The operator 3 can adjust the position of the carriage 5 in accordance with the information displayed on the display device 31.

Figure 4:
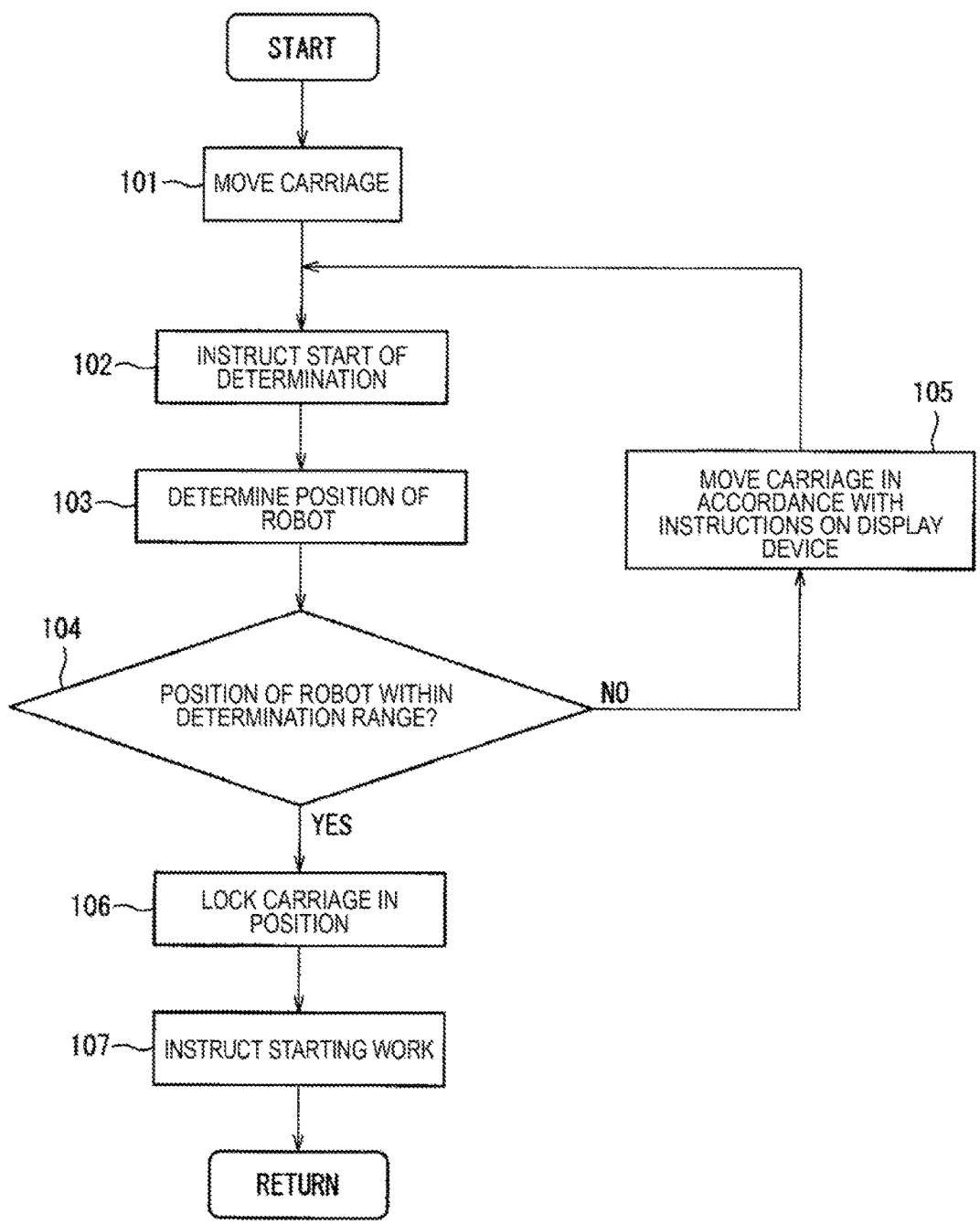
FIG. 4 is a flowchart of an operation for determining a position of a carriage.

FIG. 4 shows a flowchart of an operation that is performed by an operator when the position of the carriage is determined. In step 101, the operator 9 moves the carriage 5 to the workspace on the front side of the machine tool 6. The operator 9 moves the carriage 5 to the vicinity of the target position in the workspace.

In step 102, the operator 9 instructs the robot system 91 so as to start determining the position of the robot 1. The operator 9 presses the start button 32. The control device 2 starts the control for determining the position of the robot 1. In the present embodiment, the control for determining the position of the robot 1 is started when the start button 32 is pressed, but the embodiment is not limited to this. For example, the control for determining the position of the robot 1 may be started by an operation on the teaching panel 26.

Next, in step 103, the control device 2 determines whether or not the current position of the robot 1 is within the determination range. Then, the control device 2 displays the result of the determination on the display device 31.

Figure 5:
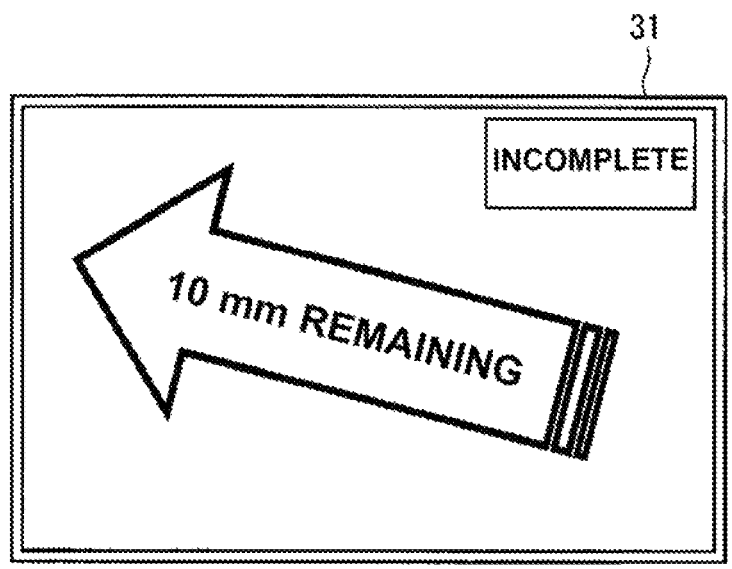
FIG. 5 is a screen of a display device when an operation for determining a position of the carriage is not complete.

FIG. 5 illustrates an example of an image that is displayed on the display device. FIG. 5 is an image that is displayed when a position of the robot 1 deviates from the determination range. The display device 31 displays the information that an adjustment of the position of the carriage 5 is not complete. By an arrow, the display device 31 displays the direction in which the carriage 5 is to be moved. Further, the display device 31 displays the movement amount to the target position.

Figure 6:
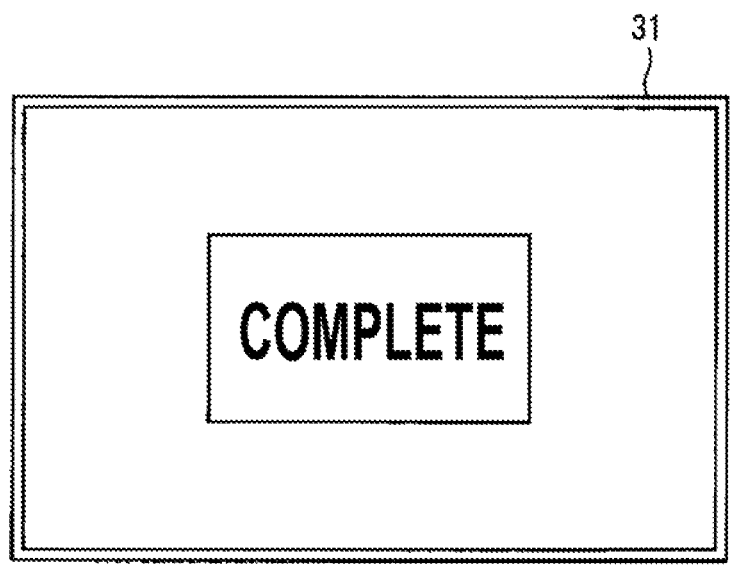
FIG. 6 is a screen of the display device when the operation for determining the position of the carriage is complete.

FIG. 6 illustrates another example of an image that is displayed on the display device. FIG. 6 illustrates an example of a display when the robot 1 is located at a position within the determination range. The display device 31 displays that the adjustment of the position of the carriage 5 is complete.

Referring to FIG. 4, in step 104, the operator 9 acquires information on whether or not the position of the robot 1 is within the determination range by the display on the display device 31. In step 104, if the position of the robot is not in the determination range, the operation proceeds to step 105.

In step 105, the operator 9 moves the carriage 5 in accordance with the information that is displayed on the display device 31 illustrated in FIG. 5. For example, the operator 9 moves the carriage 5 in the direction of the arrow by the movement amount that is displayed on the display device 31. After the carriage 5 is moved, the operation returns to step 102. The operator 9 presses the start button 32 again after moving the carriage 5. The control device 2 re-executes the control for determining the position of the robot 1.

In this way, the operator 9 can adjust the position of the carriage 5 in accordance with the information displayed on the display device 31. Each time the position of the robot 1 is determined, the control device 2 displays information about the position of the robot 1 on the display device 31. The display device 31 updates the display each time the result of the extermination by the control device 2 is produced.

In step 104, if the position of the robot 1 is within the determination range, the operation proceeds to step 106. On the display device 31, the information about the completion of the adjustment of the position is displayed as illustrated in FIG. 6.

In step 106, the operator 9 locks the carriage 5 in position. In the present embodiment, the operator 9 prevents rotation of the wheel 52 by using the stopper 55. Then, in step 107, the operator 9 instructs the robot 1 to start performing the work. For example, the operator 9 operates the teaching panel 26 so as to start the robot 1 performing the work. The robot 1 can place a workpiece on the table 61 of the machine tool 6 or can take out a workpiece that is placed on the table 61 on the basis of the predetermined operation program 27.

Note that, after the position of carriage is fixed, it is preferable that the operator 9 accurately detects the positional relationship between the robot 1 and the machine tool 6 by using the images that are captured by the camera 41. The control device 2 can compute the positional deviation of the robot 1 relative to the machine tool 6 on the basis of the images of the marks 46a, 46b that is captured by the camera 41. Then, the control device 2 can offset the operation of the robot 1. For example, the control device 2 can compute the deviation amount of the position and the deviation amount of the rotation of the robot 1, and can offset the position and posture for when the robot 1 is driven.

Figure 7:
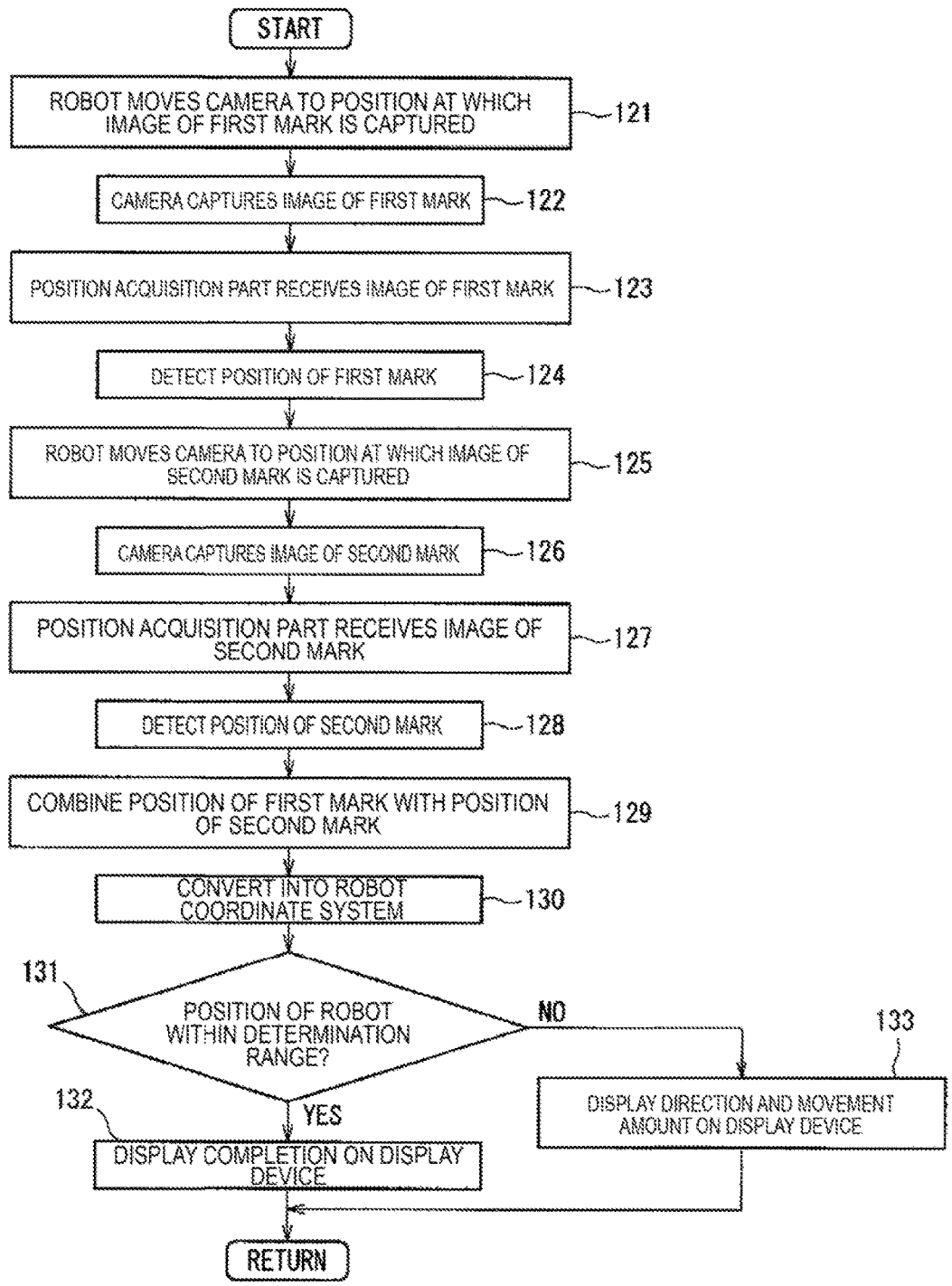
FIG. 7 is a flowchart of a control by a control device in the embodiment.

Next, the control for determining the position of the robot will be described. FIG. 7 shows a flowchart of the control for determining the position of the robot. FIG. 7 illustrates the control in step 103 in FIG. 4.

Operations of the robot 1 and the camera 41 in the control for determining the position of the robot 1 are set in the operation program 27. For example, the position and posture of the robot 1 at the time when the images of the marks 46a, 46b are captured are defined in the operation program 27. The operator 9 presses the start button 32, whereby the control device 2 start the control for determining the position of the robot 1.

In step 121, the robot 1 moves the camera 41 to the position at which the image of the first mark 46a is captured. Next, in step 122, the camera 41 captures the image of the first mark 46a. In step 123, the image processing part 28 of the position acquisition part 23 receives the image of the first mark 46a from the camera 41.

Here, referring to FIG. 2, the first mark 46a may be outside of a visual field 71 of the camera 41. In other words, the camera 41 may not be able to capture the image of the entirety of the first mark 46a. The image processing part 28 determines whether or not the entirety of the first mark 46a is included in the image. When the first mark 46a is outside of the visual field 71 of the camera 41, the display control part 25 can display a warning message on the display device 31. The operator 9 moves the carriage 5 such that the first mark 46a is located within the visual field 71. In the present embodiment, the operator 9 can adjust the position of the carriage 5 such that the camera 41 is located right above the first mark 46a.

Further, the display control part 25 may display the images that are captured by the camera 41 on the display device 31 an predetermined time intervals. While monitoring the image on the display device 31, the operator 9 can adjust the position of the carriage 5 such that the entirety of the first mark 46a is imaged.

Next, in step 124, the image processing part 28 computes the position of the first mark 46a by the execution of the image processing. In this example, the image processing part 28 computes the positions of the intersection points of the straight lines in the first mark 46a. For a method of detecting the positions of the marks, any method that is capable of detecting the two-dimensional position, or the mark, can be used. For example, for detecting the position, a template matching method in which a normalized correlation is used can be employed. In this way, the position acquisition part 23 acquires the position of the first mark 46a.

Next, in step 125, the robot 1 moves the camera 41 to a position at which an image or the second mark 46b is captured. In step 126, the camera 41 captures the image of the second mark 46b. In step 127, the image processing part 28 receives the image of the second mark 46b.

In step 127, the second mark 46b may be outside or the visual field 71 of the camera 41. The operator 9 can move the carriage 5 to a position at which the camera 41 can capture the image of the second mark 46b. In this case, the control device 2 preferably performs a control for capturing the image of the first mark 46a again in order to acquire the position of the first mark 46a again.

Alternatively, the control device 2 may offset the position of the robot 1 at which the image of the second mark 46b is captured on the basis of the result of the detection of the first mark 46a. The control device 2 can compute a direction and a deviation amount in which the position of the robot 1 deviates relative to the target position on the basis of the position of the first mark 46a. The position and posture of the robot 1 when the image of the second mark 46b is captured may be offset on the basis of the direction of the deviation and the deviation amount. By this control, the image of the second mark 46b can be more reliably captured.

In step 128, the image processing part 28 acquires the position of the second mark 46b by the execution of an image processing. In this example, the position of the intersection point of the straight lines in the second mark 46b is computed.

In step 129, the determination part 24 combines the position of the first mark 46a with the position of the second mark 46b. For example, the position acquisition part 23 can compute the position of the midpoint of the line segment connecting the position of the first mark 46a and the position of the second mark 46b.

Next, in step 130, the position acquisition part 23 concerts the computed position of the midpoint into the position in the robot coordinate system. In the robot 1, a robot coordinate system serving as references for the operation of the robot and a measurement by the vision sensor is preset. The robot coordinate system is a coordinate system in which the original point can be any point in the robot 1. For example, in the robot coordinate system, the intersection point between the J1 axis as the rotation axis extending in the vertical direction and the J2 axis extending in the horizontal direction being closest to the bottom surface of the robot, can be set to the original point. Alternatively, in the robot coordinate system, the intersection point between the top plate 53 of the carriage and the J1 axis may be the original point (see FIG. 1).

In this way, the position acquisition part 23 can acquire the positions of the marks 46a, 46b when viewed from the robot 1. The positions of the marks 46a, 46b relative to the machine tool 6 are predetermined. Accordingly, it can be said that the position acquisition part 23 computes the relative position of the robot 1 with respect to the machine tool 6. Note that the position acquisition part 23 may convert the position of the first mark 46a and the position of the second mark 46b into the coordinate values of the robot coordinate system, and then may combine the two positions.

In step 131, the determination part 24 determines whether or not the position of the robot 1 is within the determination range. The determination range can be set to a range within any distance from the target position of the midpoint. The determination part 24 can compute the distance between the target position of the preset midpoint and the current position of the midpoint. When this distance is within a predetermined threshold value, the determination part 24 can determine that the position of the robot 1 is within the determination range.

In step 131, when the position of the robot 1 is within the determination range, the control proceeds to step 132. In step 132, the display control part 25 displays that the adjustment of the position is completed to the display device 31 as illustrated in FIG. 6. In step 131, when the position of the robot 1 deviates from the determination range, the control proceeds to step 133.

In step 133, the determination part 24 computes the direction and the movement amount in which the robot 1 is to be moved on the basis of the target position of the robot 1 and the current position of the robot 1. The determination part 24 computes the direction and the movement amount from the current position to the target position. The position of the robot 1 corresponds to the position of the carriage 5. Then, the direction and the movement amount of the robot 1 in which the robot 1 is to be moved correspond to the direction and the movement amount of the carriage 5 in which the carriage 5 is to be moved. The display control part 25, as illustrated in FIG. 5, displays the direction and the movement amount in which the carriage 5 is to be moved on the display device 31, so that the robot 1 is enabled to reach the target position.

In this way, when the operator presses the start button 32, the control device 2 automatically computes a deviation of the current position of the carriage 5 and displays the deviation on the display device 31. Then, the operator can adjust the position of the carriage 5 by monitoring the information displayed on the display device 31.

Referring to FIG. 5, the display device of the present embodiment displays, by an arrow, the direction in which the carriage is to be moved. By adopting this display, the operator can easily recognize the direction for movement. As illustrated in FIGS. 5 and 6, the information on whether or not the robot 1 is located within the determination range can be displayed as "COMPLETE" or "INCOMPLETE". Alternatively, the display device may display "OK" or "NG".

Additionally, the image displayed on the display device is not limited to the direction and the movement amount in which the carriage is to be moved, and the display device may display any information. The display device may display detailed information at the time when the position of the mark is detected. For example, the display device may display the positions of the detected marks, the matching score or the like. Alternatively, the display device may display the captured image of the mark.

The camera 41 serving as a vision sensor is calibrated relative to the robot coordinate system R0. In other words, in the camera 41, the relationship between the position of the robot and the image of the mark that is acquired by the camera 41 is calibrated in advance. The control device 2 can convert the position of the mark that is detected within the image of the camera 41 into a position in the robot coordinate system. Information (calibration data) about the calibration of the position of the camera 41 relative to the robot coordinate system can be stored in the storage part 21. Typically, calibrating the vision sensor once is sufficient so long as the relative position of the vision sensor with respect to the robot coordinate system does not change.

Further, in the present embodiment, the position acquisition part 23 converts the positions of the marks 46a, 46b into the robot coordinate system in order to acquire the position or the robot 1, but the present invention is not limited to this embodiment. The control device 2 may determine the position of the robot 1 on the basis of the positions of the marks 46a, 46b in the image that is captured by the camera 41. For example, a coordinate system that has the original point at the upper left vertex of the image captured by the camera, can be set. Then, the position acquisition part detects the position of the mark in the image. The determination part may determine the position of the robot by using the coordinate values of the coordinate system in the image.

In the first robot system of the present embodiment, the marks are disposed at two locations, and the position of the robot is determined. Here, when using a symbol such as an arrow for the mark, the control device can detect the deviation of the angle in addition to the positional deviation of the robot relative to the mark. For this reason, the robot system may determine the position of the robot on the basis of one mark. In the control for determining the position of the robot using two marks as described in the present embodiment, the deviation in the rotational direction can be more accurately computed than the control for determining the position of the robot on the basis of one mark. In this way, by disposing a plurality of marks and further combining the measurement results thereof, the identification accuracy of the vision sensor may be improved.

Here, an example of the control by the position acquisition part 23 and the determination part 24 of the present embodiment will be specifically described. Here, an example of determination by using one mark will be described. The position of the mark in the robot coordinate system R0 is denoted by a symbol P. The position P of the mark corresponds to the position of the robot and the position of the carriage. The target position P0 of the mark is preset. The target position P0 can be stored in the storage part 21. When the position P of the mark reaches the target position P0, the robot 1 is also located at the target position.

The image processing part 28 of the position acquisition part 23 can compute the position P1 of the mark by using the image that is captured by the camera 41. The determination part 24 can compute the distance between the actual position P1 of the mark and the target position P0. The determination part 24 can determine that the position of the robot 1 deviates from the determination range when the distance between the position P1 of the mark and the target position P0 exceeds a preset threshold value. When the distance between the position P1 of the mark and the target position P0 is within the threshold value, the determination part 24 can determine that the position of the robot 1 is within the determination range.

For the distance between the actual position P1 of the mark and the target position P0 as above stated, a straight-line distance between the position P1 of the mark and the target position P0 can be used. Alternatively, in order to detect the two-dimensional deviation of the position, a parallel transition component and a rotational movement component can be set as direction components. In other words, x- and y-axes orthogonal to each other may be defined in a predetermined plane, and further, r-axis around z-axis extending vertically to the predetermined plane may be defined. The coordinate value of the r-axis can be represented by a rotation angle. Further, the determination part 24 may compute the deviation in relation to the direction of each component. For example, the deviation in the x-axis direction may be computed and the determination may be executed by using the threshold value in the x-axis direction, and the deviation in the y-axis direction may be computed and the determination may be executed by using the threshold value in the y-axis direction.

The determination part can compute the positional deviation of the robot in a predetermined direction on the basis of the position of the mark acquired by the position acquisition part. Then, the determination part can determine whether or not the positional deviation of the robot is within the determination range. Further, the determination part can execute a determination in a plurality of directions. By this control, a detailed determination can be executed in accordance with the performance of the robot 1.

Note that, in the same way as the modified example that is described later, when the deviations of the three-dimensional position and posture are calculated, components for the posture of the robot 1 may be added so as to evaluate the deviation in each component of the x-axis direction, the y-axis direction, the z-axis direction, the w-axis direction (the directions around the x-axis), the p-axis direction (the directions around the y-axis), and the r-axis direction (the directions around the z-axis).

In the first robot system, the position of the mark needs to be preset. Further, the position of the mark relative to the machine tool is kept constant. In the first robot system, the mark is disposed on the top face of the columnar member that is erected on the ground, but the present invention is not limited to this embodiment. The marks can be disposed within a range in which the images of the marks can be captured by the vision sensor. When the vision sensor is fixed to the robot, the mark can be disposed at a position where the image of the mark can be captured by an operation of the robot.

For example, the mark may be disposed on a device on which the robot performs the work. In the present embodiment, the mark may be disposed on the frame of the machine tool. Alternatively, the shape of a portion Of the body of the machine tool may be used for the mark. For example, a part of the frame of the machine tool may be used for the mark in order to capture the image of the mark with the camera. The position of the mark corresponds to the position of the device on which the robot performs the work. The mark can be disposed at any position so long as the relative positional relationship with respect to the device on which the robot performs the work is not changed.

Figure 8:
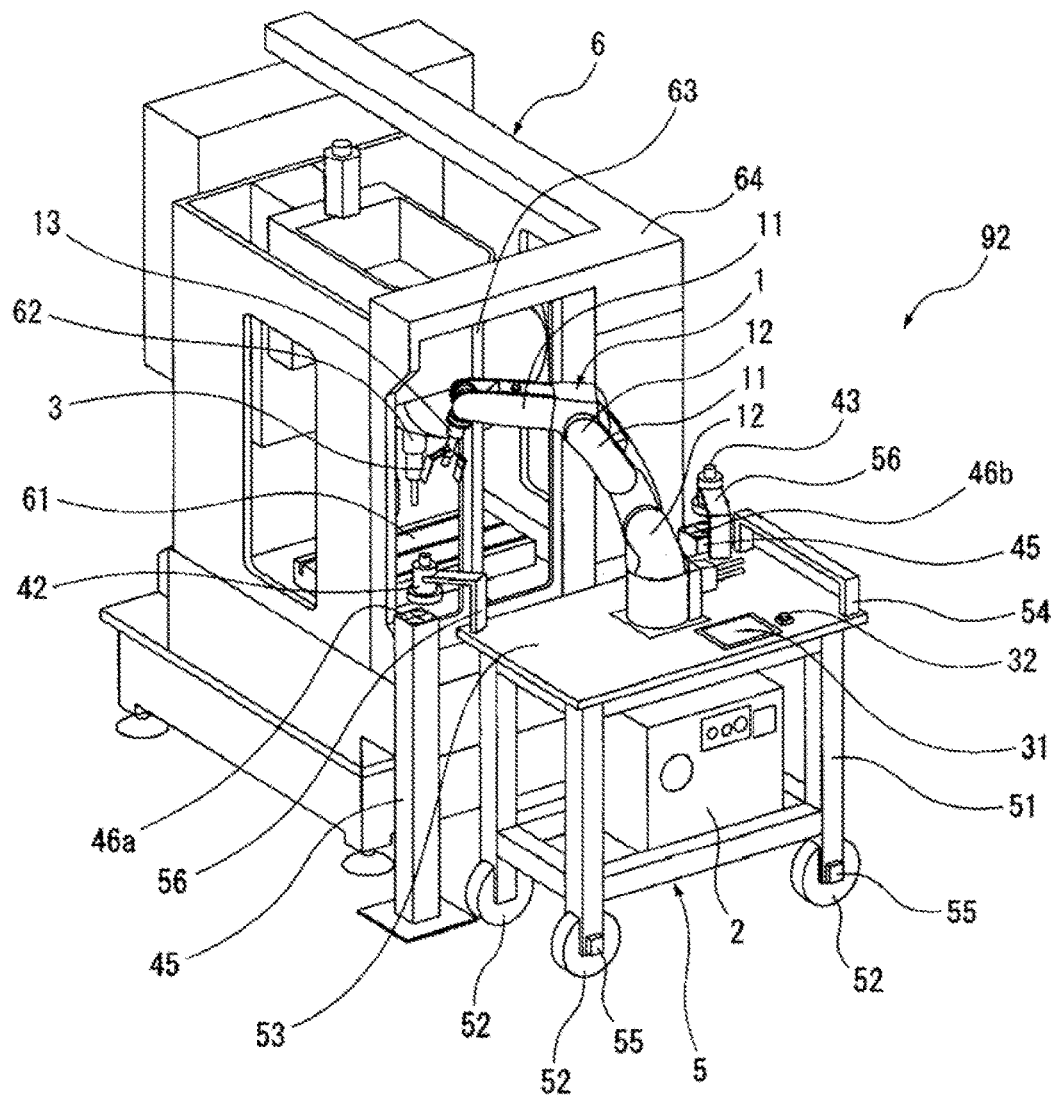
FIG. 8 is a perspective view of second robot system in the embodiment.

FIG. 8 shows a perspective view of second robot system of the present embodiment. The second robot system 92 includes a plurality of cameras 42, 43. The cameras 42, 43 serving as vision sensors are fixed to the carriage 5. The cameras 42, 43 are each fixed on the top plate 53 via a support member 56. The cameras 42, 43 are arranged so as to correspond to the positions of the marks 46a, 46b when the robot 1 is located at the target position.

In this way, the camera may be fixed to the carriage 5. In the second robot system 92, the position of the carriage 5 can be adjusted without driving the robot 1. In other words, the position of the robot 1 can be adjusted without driving the robot 1. Alternatively, images of the first mark 46a and the second mart 46b can be concurrently captured. Accordingly, the position of the carriage 5 can be adjusted in a short time.

When the cameras 42, 43 are fixed to the carriage 5, the images that are captured by the cameras 42, 43 can be calibrated relative to the carriage 5. In this case, the detected position of the mark may be converted into a coordinate value of another coordinate system without a conversion of the detected position of the mark into the coordinate value of the robot coordinate system. For example, the control device can convert the detected position into a coordinate value of a coordinate system in which a predetermined point on the carriage is set as the original point.

In the second robot system 92, the position acquisition part 23 can compute the positions of the marks 46a, 46b on the basis of the images that are captured by the cameras 42, 43. The determination part 24 determines whether or not the position of the robot 1 is within a predetermined determination range on the basis of the positions of the marks 46a, 46b. When the position of the robot 1 deviates from the determination range, the display device 31 can display the direction and the movement amount in which the carriage 5 is to be moved.

In the above embodiment, the marks 46a, 46b are disposed in the workspace where the carriage 5 is to be located, and the cameras 41, 43, 43 are disposed on the robot 1 or on the carriage 5. However, the present invention is not limited to this embodiment, and the camera may be disposed in the workspace and the mark may be disposed on the robot or on the carriage.

Figure 9:
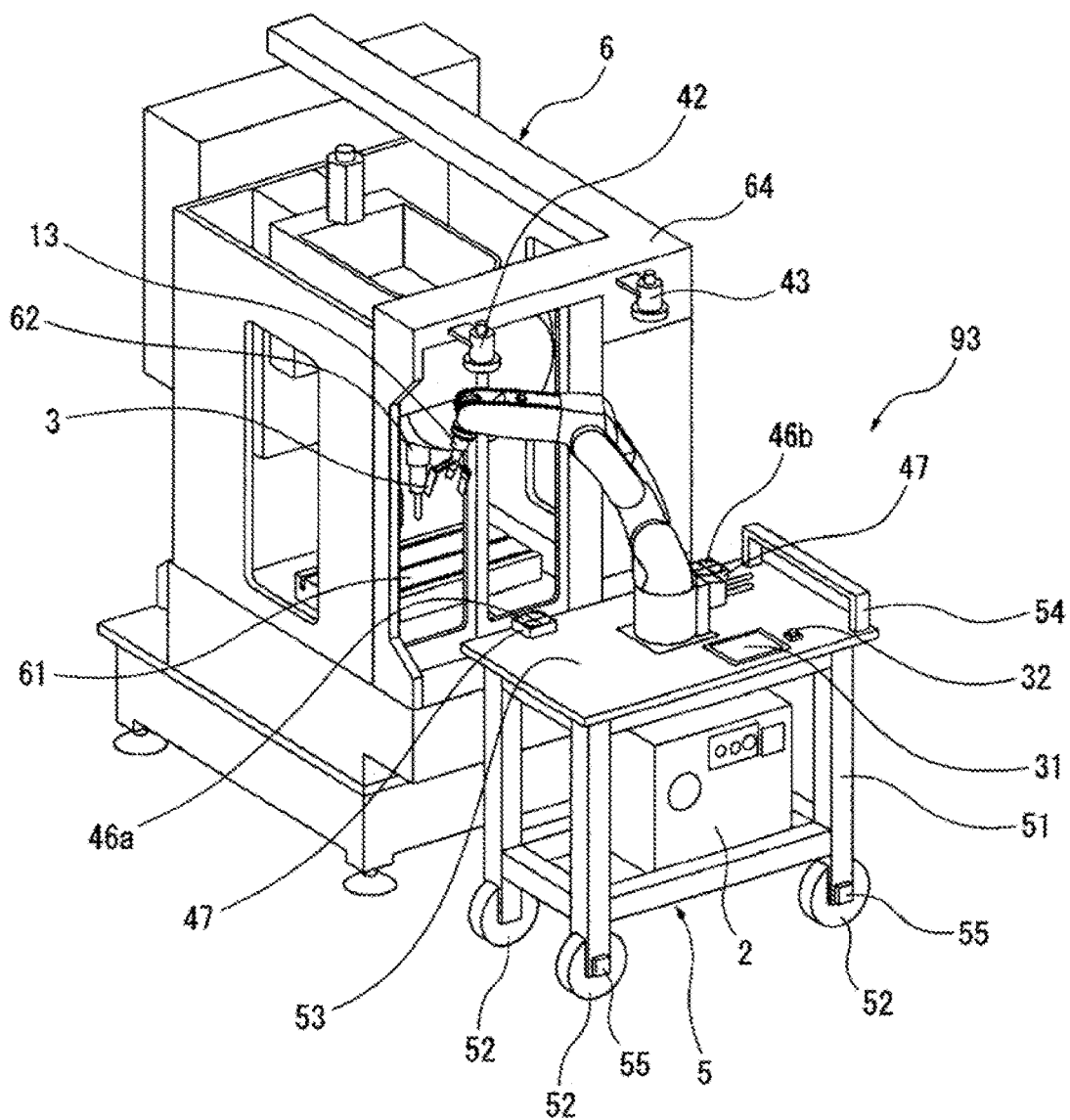
FIG. 9 is a perspective view of third robot system in the embodiment.

FIG. 9 shows a perspective view of third robot system 93 of the present embodiment. In the third robot system 93, the cameras 42, 43 serving as vision sensors are fixed to the machine tool 6. In other words, the cameras are disposed in the workspace. Further, the marks 46a, 46b are disposed on the carriage 5. On the top plate 53 of the carriage 5, a plate-like member 47 on which the marks 46a, 46b are inscribed is fixed. The cameras 42, 43 are fixed to the upper part of the frame body 64 of the machine tool 6. The cameras 42, 43 are disposed so as to correspond to the positions of the marks 46a, 46b when the robot 1 is located at the target position. The images that are captured by the cameras 42, 43 can be transmitted to the control device 2 via a wireless device. Alternatively, the images captured by the cameras 42, 43 may be transmitted to the control device 2 via a wired communication device. For example, after disposing the carriage 5 in the vicinity of the machine tool 6, the operator can connect, to the control device 2, the communication line connected to the cameras 42, 43.

In the third robot system 93, the position of the robot 1 can be adjusted by control similar to that of the second robot system 92. The third robot system 93 can adjust the position of the robot 1 by moving the carriage 5 on the basis of the images of the marks 46a, 46b that are captured by the cameras 42, 43.

In this way, the cameras 42, 43 can be disposed in the workspace where the carriage 5 is to be located. A portion at which the camera is installed is not limited to the frame body of the machine cool. For example, a support member that is erected on the ground may be arranged on the side of the machine tool and the camera may be fixed to a support member.

Further, in the example illustrated in FIG. 9, the two marks 46a, 46b are disposed on the carriage 5. However, the present invention is not limited to this embodiment, and one mark may be disposed on the wrist 13 of the robot 1. For example, a plate-like member on which one mark is inscribed may be fixed oh the wrist 13. In this robot system, two cameras can capture marks by changing the position and posture of the robot. Further, the position of the robot 1 can be adjusted by control similar to that or the first robot system of the present embodiment.

In the robot system described above, the control device 2 of the robot has a function of processing the image that is captured by the vision sensor and determining the image.

The present invention is net limited to this embodiment, and the robot system may include an image processing device that has a function of processing an image and determining the image. The image processing device includes an arithmetic processing device including a CPU, a RAM or the like. The image processing device can be formed so as to communicate with the control device via the communication device. For example, an image processing device that includes a position acquisition part including an image processing part, a determination part, a display control part, and an operation control part for controlling the camera may be connected to the control device.

Although the above-mentioned camera serving as the vision sensor is a two-dimensional camera, any vision sensor and any control method that can detect the positions of the marks, can be employed. Next, modified examples of the control for determining the positions of the vision sensor and the robot will be described.

(Modified Example 1 of Vision Sensor and Control for Determining Position)

In the modified example 1, the robot system detects the position of the robot by using a stereo measurement. A two-dimensional camera serving as a vision sensor is arranged at the distal end of the arm of the robot. In the workspace where the carriage is located, third mark is disposed in addition to the first mark and the second mark. The respective marks are disposed at positions separated from one another.

First, the camera captures the image of the first mark. Next, after the robot moves to such an extent that the first mark does not protrude out of the visual field of the camera, the camera captures the image of the first mark again. The camera captures the image of an identical mark from two different viewpoints. By adopting this stereo measurement, the coordinate values (x, y, z) of the three-dimensional position of the first mark can be acquired. Next, the same measurement as above is performed with respect to the second mark and the third mark. A three-dimensional plane that passes through three points can be computed by using three-dimensional positions of the first mark, the second mark, and the third mark. As a result thereof, a three-dimensional positional relationship between the robot and the machine tool can be acquired. By the execution of the three-dimensional measurement, an inclination of the carriage can be determined in addition to the position in the plane.

(Modified Example 2 of Vision Sensor and Control for Determining Position)

In the modified example 2, a three-dimensional camera serving as a vision sensor is arranged at the distal end of the arm of the robot. The robot system detects the position of the machine tool by using the three-dimensional measurement. The vision sensor captures the image of the first mark, and the control device detects the two-dimensional position. Next, the vision sensor irradiates two laser beams that intersect with each other on a plane on which the first mark is disposed. The control device determines the inclination of the plane by identifying the laser beams captured in the image. The control device can obtain the coordinate values (x, y, z, w, p, r) that relate to the three-dimensional position and orientation of the first mark by combining the result of the two-dimensional measurement with the computed plane.

The three-dimensional position and posture of the robot can be determined by a detection of the three-dimensional position and orientation of the first mark. Furthermore, the second mark and the third mark are measured and the coordinate values of the three-dimensional position of each point are combined, so that the coordinate values (x, y, z, w, p, r) that relate to the three-dimensional position and posture may be computed with higher accuracy.

In this example, a camera irradiating a laser beam is exemplified as a three-dimensional camera. However, any vision sensor than is capable of acquiring the three-dimensional position and orientation of the mark, can be employed.

(Modified Example 3 of Vision Sensor and Control for determining Position)

In the modified example 3, three two-dimensional cameras serving as vision sensors are arranged on the carriage, and the position of the machine tool is acquired by using the three-dimensional measurement. The three cameras are disposed such that the visual lines of the three cameras are not parallel to one another and the visual lines are directed in mutually different directions. In the workspace, the first mark, the second mark, and the third mark are disposed. The dimension and shape of the triangle that is formed by the three positions of the marks are predetermined.

The images of the first mark, the second mark, and the third mark are individually captured by using the three cameras that is arranged on the carriage. The control device computes three visual lines on the basis of the results of capturing images of the first mark, the second mark, and the third mark. The control device can compute the three-dimensional positions of the vortexes of the triangle by fitting the three visual lines to the known triangle. The control device can execute the determination on the basis of this three-dimensional position.

Note that, in addition to the above-mentioned modified examples, a three-dimensional camera may be arranged on the carriage. Alternatively, the modified example 3 may be implemented by using a two-dimensional camera that is arranged at the distal end of the arm of the robot. The above-described controls for determining the position can be suitably combined.

For the mark of the present embodiment, a symbol is employed. Any mark is employed so long as the mark can be identified by the vision sensor. For example, for the mark, a bar-code such as QR code (registered trademark) or matrix code may be used. Alternatively, the mark may include the bar-code in addition to the symbol. For example, there is a case that a plurality of machine tools that perform the work are arranged side-by-side. In this case, the mark can include a bar-code that indicates correspondence between the machine tool and the robot in order to prevent an erroneous selection of the machine tool by the operator. The vision sensor captures the image of the bar-code, and then the control device may display the machine tool number or the like on the display device.

The vision sensor of the present embodiment captures the image of the mark in order to detect the position of the machine tool. The present invention is not limited to this embodiment, and the vision sensor may be used for purposes such as an inspection of the workpiece and a detection of the position of the workpiece.

The mechanism for driving the robot of the present embodiment is a vertical multi-joint mechanism. The present invention is not limited to this embodiment and any mechanism can be employed. For example, a linear motion mechanism, a parallel link mechanism or the like may be employed as a mechanism for driving the robot.

In each control described above, the sequence of steps can be changed as appropriate, within such a range that the function and operation are not changed.

The present invention can provide a robot system that is capable of easily determining the position of the carriage for supporting a robot.

The embodiments described above may be combined as appropriate. In each of the drawings described above, identical or equivalent parts are denoted by an identical reference number. Note that the above embodiments are examples and do not limit the invention. Also note that, in the embodiments, modifications to the embodiments that are recited in the claims are included.

The invention claimed is:

1. A robot system comprising:
a robot configured to perform a predetermined work;
a carriage for supporting the robot, and configured to be moved by an operation of an operator;
a vision sensor fixed on a wrist of the robot;
a first mark and a second mark disposed in a workspace where the carriage is located when the robot performs the work;
a control device including an arithmetic processing device configured to process information acquired by the vision sensor and controlling an operation of the robot; and
a display device configured to display a result of the processing executed by the arithmetic processing device; wherein
the control device changes a position and a posture of the robot so as to move the vision sensor to the position for capturing an image of the second mark and captures an image of the second mark by the vision sensor after the vision sensor captures an image of the first mark in a state where the carriage is moved to the workspace,
the arithmetic processing device includes a position acquisition part configured to acquire positions of the first mark and the second mark on the basis of images captured by the vision sensor, and a determination part configured to determine whether or not the robot is located at a position within a predetermined determination range on the basis of the positions of the first mark and the second mark acquired by the position acquiring part,
the determination part computes, in a case when determining that the position of the robot deviates from the determination range, a direction and a movement amount in which the carriage is to be moved so as to enable the robot to reach a target position, and the display device displays the direction and the movement amount in which the carriage is to be moved.

2. The robot system according to claim 1, wherein
relationships between the position of the robot and an image of the first mark and an image of the second mark acquired by the vision sensor are calibrated in advance in the vision sensor, and
the position acquisition part computes the positions of the first mark and the second mark by processing an image of the first mark and an image of the second mark, in which a positional relationships with respect to the workspace are set.

3. The robot system according to claim 1, wherein the determination part computes a distance between the actual position of the mark and the target position of the mark in a plurality of predetermined directions on the basis of positions of the first mark and the second mark acquired by the position acquisition part, and determines whether or not the distance is within the determination range in respective directions.

4. The robot system according to claim 1, wherein the display device updates a display on the basis of a result of a determination by the determination part such that the operator can adjust a position of the carriage while monitoring the display device.

5. A robot system comprising:
a robot configured to perform a predetermined work;
a carriage for supporting the robot, and configured to be moved by an operation of an operator;
a first vision sensor and a second vision sensor arranged in a workspace where the carriage is located when the robot performs the work;
a mark disposed on a wrist of the robot;
a control device including an arithmetic processing device configured to process information acquired by the vision sensor and controlling an operation of the robot; and
a display device configured to display a result of a computation executed by the arithmetic processing device; wherein
the control device changes a position and a posture of the robot so as to move the mark to the position for capturing an image of the mark by the second vision sensor and captures an image of the mark by the second vision sensor after the first vision sensor captures an image of the mark in a state where the carriage is moved to the workspace,
the arithmetic processing device includes a position acquisition part configured to acquire positions of the mark on the basis of an image captured by the first vision sensor and an image captured by the second vision sensor, and a determination part configured to determine whether or not the robot is located at a position within a predetermined determination range on the basis of the positions of the mark acquired by the position acquiring part,
the determination part computes, in a case when determining that the position of the robot deviates from the determination range, a direction and a movement amount in which the carriage is to be moved so as to enable the robot to reach a target position, and the display device displays the direction and the movement amount in which the carriage is to be moved.

* * * * *

UNITED STATES PATENT AND TRADEMARK OFFICE
CERTIFICATE OF CORRECTION

PATENT NO. : 10,500,731 B2
APPLICATION NO. : 15/723732
DATED : December 10, 2019
INVENTOR(S) : Junichirou Yoshida and Fumikazu Warashina It is certified that error appears in the above-identified patent and that said Letters Patent is hereby corrected as shown below:

In the Claims

Column 16, Claim 2, Line 2, delete "a" after the word which.

Signed and Sealed this
Fourteenth Day of April, 2020

Andrei Iancu
*Director of the United States Patent and Trademark Office*